United States Patent
Katoh et al.

(10) Patent No.: US 8,438,916 B2
(45) Date of Patent: May 14, 2013

(54) METER APPARATUS

(75) Inventors: Takahira Katoh, Kariya (JP); Kenichi Hiura, Kariya (JP); Minoru Sumiya, Nagoya (JP); Masahiro Kuno, Kariya (JP)

(73) Assignee: Denso Corporation, Kariya (JP)

( * ) Notice: Subject to any disclaimer, the term of this patent is extended or adjusted under 35 U.S.C. 154(b) by 147 days.

(21) Appl. No.: 13/199,401

(22) Filed: Aug. 29, 2011

(65) Prior Publication Data

US 2012/0055241 A1  Mar. 8, 2012

(30) Foreign Application Priority Data

Sep. 3, 2010 (JP) ................................ 2010-197935

(51) Int. Cl.
*G01M 15/00* (2006.01)
(52) U.S. Cl.
USPC ......................................................... 73/115.01
(58) Field of Classification Search ............... 73/115.01, 73/115.08
See application file for complete search history.

(56) References Cited

U.S. PATENT DOCUMENTS

| | | | |
|---|---|---|---|
| 4,523,457 A * | 6/1985 | Bayer et al. ................ | 73/114.52 |
| 8,160,298 B2 * | 4/2012 | Okumura et al. ............ | 382/103 |
| 8,279,141 B2 * | 10/2012 | Katoh et al. ................. | 345/56 |
| 8,350,687 B2 * | 1/2013 | Maruyama et al. .......... | 340/438 |
| 8,384,619 B2 * | 2/2013 | Shirakura et al. ........... | 345/24 |
| 2005/0280521 A1 * | 12/2005 | Mizumaki .................... | 340/438 |
| 2008/0238913 A1 * | 10/2008 | Katoh et al. ................. | 345/418 |

FOREIGN PATENT DOCUMENTS

| | | |
|---|---|---|
| JP | 5-107271 | 4/1993 |
| JP | 10-267701 | 10/1998 |
| JP | 11-24612 | 1/1999 |
| JP | 2003-149012 | 5/2003 |
| JP | 2005-181301 | 7/2005 |
| JP | 2006-153556 | 6/2006 |
| JP | 2006-194664 | 7/2006 |
| JP | 2006-292658 | 10/2006 |

OTHER PUBLICATIONS

Instruction manual of Fit, Japan, Honda Motor Company, Ltd., 2002; p. 84.
Office Action issued Dec. 11, 2012 in corresponding Japanese Application No. 2010-197935 with English translation.
Office action dated Sep. 25, 2012 in corresponding Japanese Application No. 2010-197935.

* cited by examiner

*Primary Examiner* — Freddie Kirkland, III
(74) *Attorney, Agent, or Firm* — Harness, Dickey & Pierce, PLC

(57) ABSTRACT

A meter apparatus is mountable on a vehicle equipped with an internal combustion engine having an output shaft that rotates at a predetermined idling speed during idling of the engine. When the vehicle satisfies a predetermined stop condition during rotation of the output shaft at the idling speed, the rotation of the output shaft is stopped temporarily. The meter apparatus includes a pointer needle that moves according to a rotation speed of the output shaft to indicate the rotation speed. The amount of movement of the pointer needle with respect to a change in the rotation speed of the output shaft is less when the rotation speed is in a low speed range below the idling speed than when the rotation speed is in a high speed range above the idling speed.

6 Claims, 6 Drawing Sheets

METER APPARATUS

CROSS REFERENCE TO RELATED APPLICATION

This application is based on and claims priority to Japanese Patent Application No. 2010-197935 filed on Sep. 3, 2010, the contents of which are incorporated herein by reference.

FIELD OF THE INVENTION

The present invention relates to a meter apparatus having a pointer needle that moves according to a rotation speed of an output shaft of an internal combustion engine to indicate the rotation speed.

BACKGROUND OF THE INVENTION

In some meter apparatus, the amount of angle by which a pointer needle moves according to a rotation speed of an internal combustion engine in a predetermined speed range is greater than the amount of angle by which the pointer needle moves according to the rotation speed of the internal combustion engine in the other speed range. For example, in a meter apparatus disclosed in JP-A-11-24612, the amount of angle by which a pointer needle moves according to a rotation speed of an internal combustion engine in a high speed range for a normal operation, is greater than the amount of angle by which the pointer needle moves according to the rotation speed in the other speed range. Thus, a change in the rotation speed of the internal combustion engine in the high speed range for the normal operation can be easily understood.

In a vehicle meter apparatus disclosed in JP-A-2006-194664, the amount of angle by which a pointer needle moves according to a rotation speed of an internal combustion engine both in an idling speed range of 1000 rpm or less and in a high speed range of 3000 rpm or more is greater than the amount of angle by which the pointer needle moves according to the rotation speed in the other speed range.

In recent years, there have been an increased number of vehicles equipped with an internal combustion engine having a so-called "stop idling" function for temporarily stopping rotation of an output shaft of the engine when the vehicle satisfies a predetermined stop condition during rotation of the output shaft at an idling rotation speed. In a meter apparatus mounted on a vehicle equipped with an internal combustion engine having such a stop idling function, whenever the stop idling function is activated, a pointer needle, which moves according to a rotation speed of an output shaft of the engine, moves from a position indicating an engine idling speed to a position indicating a temporary engine stop.

Assuming that the meter apparatus disclosed in JP-A-2006-194664 is employed in the vehicle equipped with the engine having the stop idling function, the pointer needle frequently and repeatedly moves by a large amount of angle each time the stop idling function is activated. Occupants of the vehicle, in particular, a driver, may feel uncomfortable with the frequently repeated large movement of the pointer needle.

SUMMARY OF THE INVENTION

In view of the above, it is an object of the present invention to provide a meter apparatus for providing a comfortable display of a rotation speed of an output shaft of an internal combustion engine.

According to an aspect of the present invention, a meter apparatus is mounted on a vehicle equipped with an internal combustion engine having an output shaft that rotates at a predetermined idling speed during idling of the engine. When the vehicle satisfies a predetermined stop condition during rotation of the output shaft at the idling speed, the rotation of the output shaft is stopped temporarily. The meter apparatus includes a pointer needle that moves according to a rotation speed of the output shaft to indicate the rotation speed. The amount of movement of the pointer needle with respect to a change in the rotation speed of the output shaft is less when the rotation speed is in a low speed range below the idling speed than when the rotation speed is in a high speed range above the idling speed.

BRIEF DESCRIPTION OF THE DRAWINGS

The above and other objects, features, and advantages will become more apparent from the following description and drawings in which like reference numerals depict like elements. In the drawings.

DETAILED DESCRIPTION OF THE PREFERRED EMBODIMENTS

First Embodiment

Figure 1:
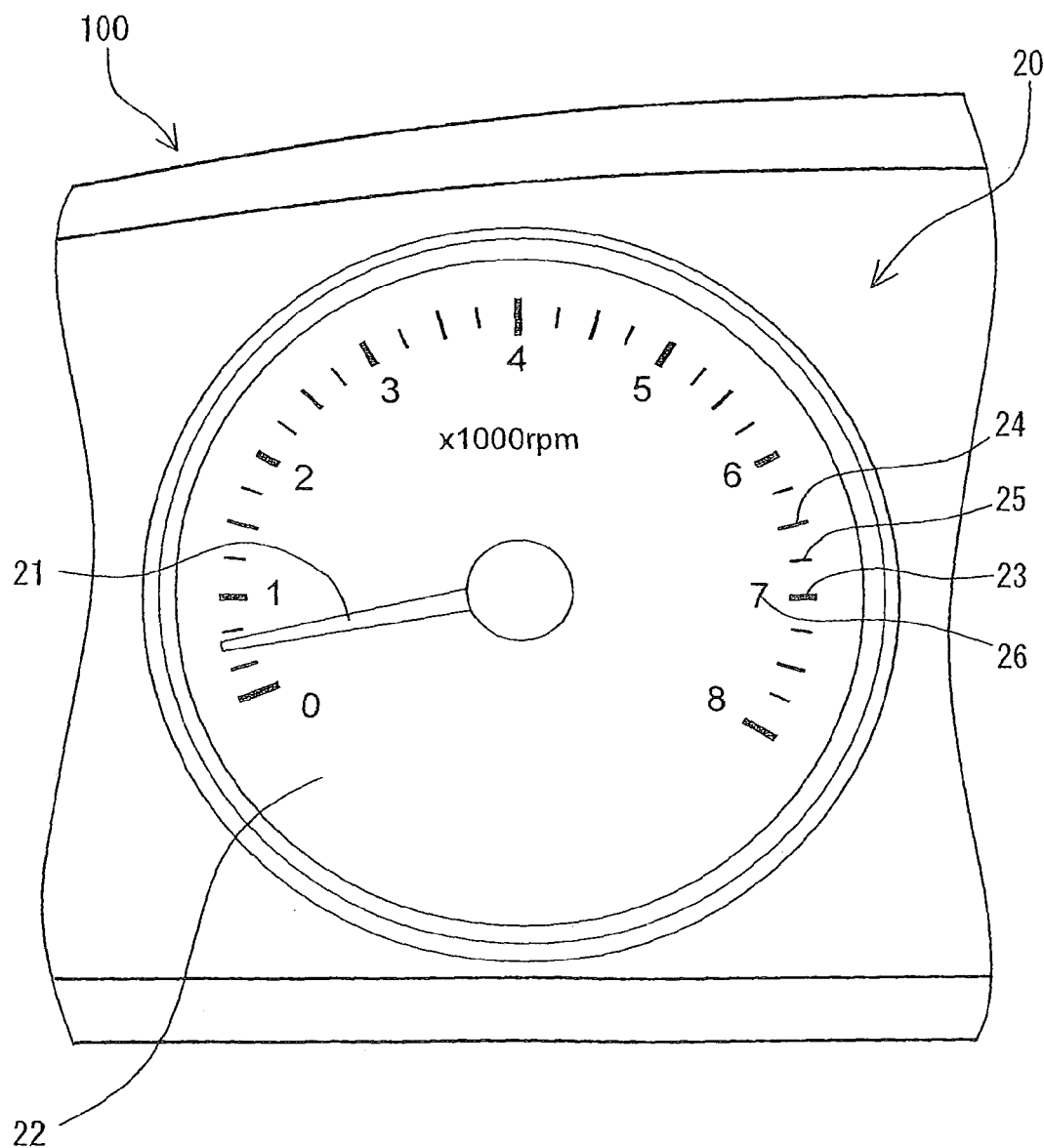
FIG. 1 is a diagram illustrating a front view of a combination meter apparatus according to a first embodiment of the present invention.

A combination meter apparatus 100 according to a first embodiment of the present invention is described below with reference to FIG. 1. FIG. 1 is a diagram illustrating a front face of the combination meter apparatus 100. The combination meter apparatus 100 is located in an instrument panel in a compartment of a vehicle in such a manner that the front face of the combination meter apparatus 100 faces a driver seat.

The combination meter apparatus 100 can display various information of the vehicle. The combination meter apparatus 100 includes a tachometer 20 for displaying a rotation speed of an output shaft of an internal combustion engine, such as a gasoline engine, mounted on the vehicle. In addition to the tachometer 20, the combination meter apparatus 100 can include a speed meter, a water temperature meter, an oil temperature meter, and a fuel meter.

The tachometer 20 has a round face. The tachometer 20 has a pointer needle 21 and a dial 22. The pointer needle 21 moves according to the rotation speed of the output shaft of the engine, thereby indicating the rotation speed. The dial 22 has first markings 23, second markings 24, and third markings 25 that are arranged on a path along which a tip of the pointer needle 21 moves. When the pointer needle 21 moves according to the rotation speed, the tip of the pointer needle 21 overlaps the first markings 23, second markings 24, and third markings 25 corresponding to the rotation speed. Thus, the pointer needle 21, the first markings 23, the second markings 24, and the third markings 25 work in conjunction to indicate the rotation speed.

Each first marking 23 has a first size. Each second marking 24 has a second size. Each third marking 25 has a third size. The first size, the second size, and the third size are different from each other. That is, the first marking 23, the second marking 24, and the third marking 25 have different sizes.

Specifically, the first marking 23 is greater in size than the second marking 24 and the third marking 25. Therefore, the first marking 23 is more easily visible to occupants of the vehicle than the second marking 24 and the third marking 25. The first markings 23 are arranged at a 1000-rpm interval to indicate the rotation speed in a range from 0 rpm to 8000 rpm. The dial 22 has characters 26 indicating numbers "0" to "8", respectively. Each character 26 is located inside a corresponding first marking 23 in a radial direction of the tachometer 20.

The second marking 24 is smaller in size than the first marking 23 and greater in size than the third marking 25. The second markings 24 are arranged at a 1000-rpm interval to indicate the rotation speed in a range from 500 rpm to 7500 rpm. The first markings 23 and the second markings 24 are alternately arranged on the path along which the tip of the pointer needle 21 moves.

The third marking 25 is smaller in size than the first marking 23 and the second marking 24. The third markings 25 are arranged at a 500-rpm interval to indicate the rotation speed in a range from 750 rpm to 7750 rpm. The third marking 25 is located between the first marking 23 and the second marking 24 that is located adjacent to the first marking 23.

The dial 22 is made of translucent material such as clear and colorless polycarbonate. Specifically, the dial 22 includes a translucent sheet and an opaque (i.e., lightproof) layer printed on a surface of the translucent sheet except portions where the first markings 23, the second markings 24, the third markings 25, and the characters 26 are located. Thus, the first markings 23, the second markings 24, the third markings 25, and the characters 26 can be illuminated by light from an external light source such as a light emitting diode (LED) 70, which is described later.

In dark environments where outside light is little, the first markings 23, the second markings 24, the third markings 25, and the characters 26 are illuminated by using the external light source. In contrast, in the dark environments, the pointer needle 21 illuminates by itself. Thus, the tachometer 20 can be viewed even in the dark environments so that occupants of the vehicle can understand the rotation speed of the output shaft of the engine.

Figure 2:
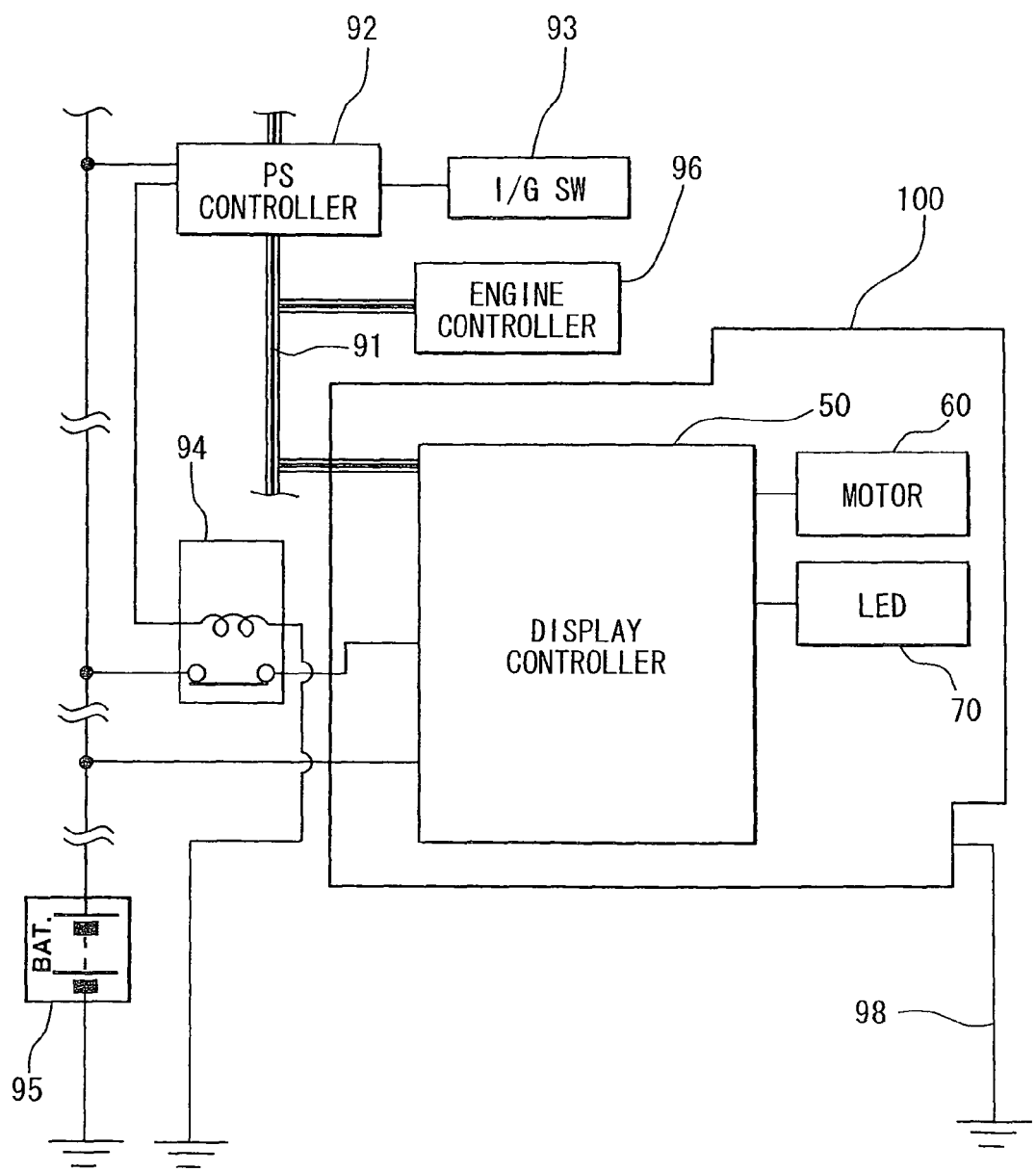
FIG. 2 is a diagram illustrating a circuit configuration of the combination meter apparatus of FIG. 1.

An electrical configuration of the combination meter apparatus 100 is described below with reference to FIG. 2.

The combination meter apparatus 100 includes a display controller 50, a step motor 60, and the LED 70. The combination meter apparatus 100 is connected to a battery 95, an ignition relay 94, an in-vehicle LAN 91, and an earth line 98. The earth line 98 is grounded.

The display controller 50 includes a processor for performing various processing operations, a flash memory for storing programs and vehicle information used in the processing operations, and a random access memory used when the processor performs the processing operations. In addition, the display controller 50 includes a motor driver (not shown) for controlling the step motor 60 and a regulator (not shown) for controlling the LED 70.

The display controller 50 can be supplied with power from two feed lines. The first feed line is connected directly to the battery 95. Thus, the display controller 50 is always supplied with power from the first feed line. The second feed line is connected through the ignition relay 94 to the battery 95. Thus, the display controller 50 is supplied with power from the second feed line, only when the ignition relay 94 is in an ON position. Further, the display controller 50 is connected to the in-vehicle LAN 91 and obtains vehicle information through the in-vehicle LAN 91. The vehicle information includes engine operation information and engine rotation speed information. The engine operation information indicates whether the engine is operating or stopped. The engine rotation speed information indicates the rotation speed of the output shaft of the engine.

The step motor 60 has a needle shaft (not shown) that rotates according to a control signal from the motor driver of the display controller 50. The needle shaft of the step motor 60 is joined to a root of the pointer needle 21 so that the pointer needle 21 can rotate with rotation of the need shaft of the step motor 60.

A power supply (PS) controller 92 and an engine controller 96 are connected to the in-vehicle LAN 91. The PS controller 92 is connected to the battery 95, an ignition switch 93, and the ignition relay 94. The PS controller 92 is supplied with power from the battery 95. The PS controller 92 detects whether the ignition switch 93 is in an ON state or in an OFF state. For example, the ignition switch 93 can be switched between the ON state and the OFF state according to a push operation applied to the ignition switch 93 by the occupants, in particular, a driver of the vehicle. When the ignition switch 93 is in the ON state, the PS controller 92 applies a voltage to the ignition relay 94 so that the ignition relay 94 can be in the ON state. Further, the PS controller 92 outputs the engine operation information, indicating whether the engine is operating or stopped, to the in-vehicle LAN 91 based on the push operation.

The engine controller 96 controls the engine based on driver's operations. The engine controller 96 starts the engine according to information outputted by the PS controller 92 to the in-vehicle LAN 91. Further, the engine controller 96 outputs the engine rotation speed information, indicating the rotation speed of the output shaft of the engine, to the in-vehicle LAN 91.

An idle rotation speed of a typical gasoline engine is between 500 rpm and 1000 rpm. According to the first embodiment, an idle rotation speed of the engine, which is controlled by the engine controller 96, is 700 rpm. The engine has a stop idling function. The stop idling function is activated when a predetermined stop condition is satisfied. For example, the stop condition can be satisfied when a running speed of the vehicle is zero. When the stop idling function is activated, the output shaft of the engine rotating at the idle rotation speed is temporarily stopped.

When the stop condition is satisfied during a period where the engine is operating, the engine controller 96 controls the engine so that rotation of the output shaft of the engine can be temporarily stopped. The engine controller 96 restarts the temporarily-stopped engine, for example, when the driver operates an accelerator pedal (not shown) of the vehicle.

When the display controller 50 obtains information indicating that the temporarily-stopped engine is restarted, the display controller 50 controls the step motor 60 so that the rotation speed can be displayed on the tachometer 20. Specifically, the display controller 50 calculates a rotation direction, a rotation angle, and a rotation speed of the needle shaft of the step motor 60 based on the engine rotation speed information obtained through the in-vehicle LAN 91. Then, the display controller 50 outputs pulse power to the step motor 60 based on the calculation results. Further, the display controller 50 causes the LED 70 to illuminate so that the tachometer 20 can be illuminated by light from the LED 70.

Figure 3:
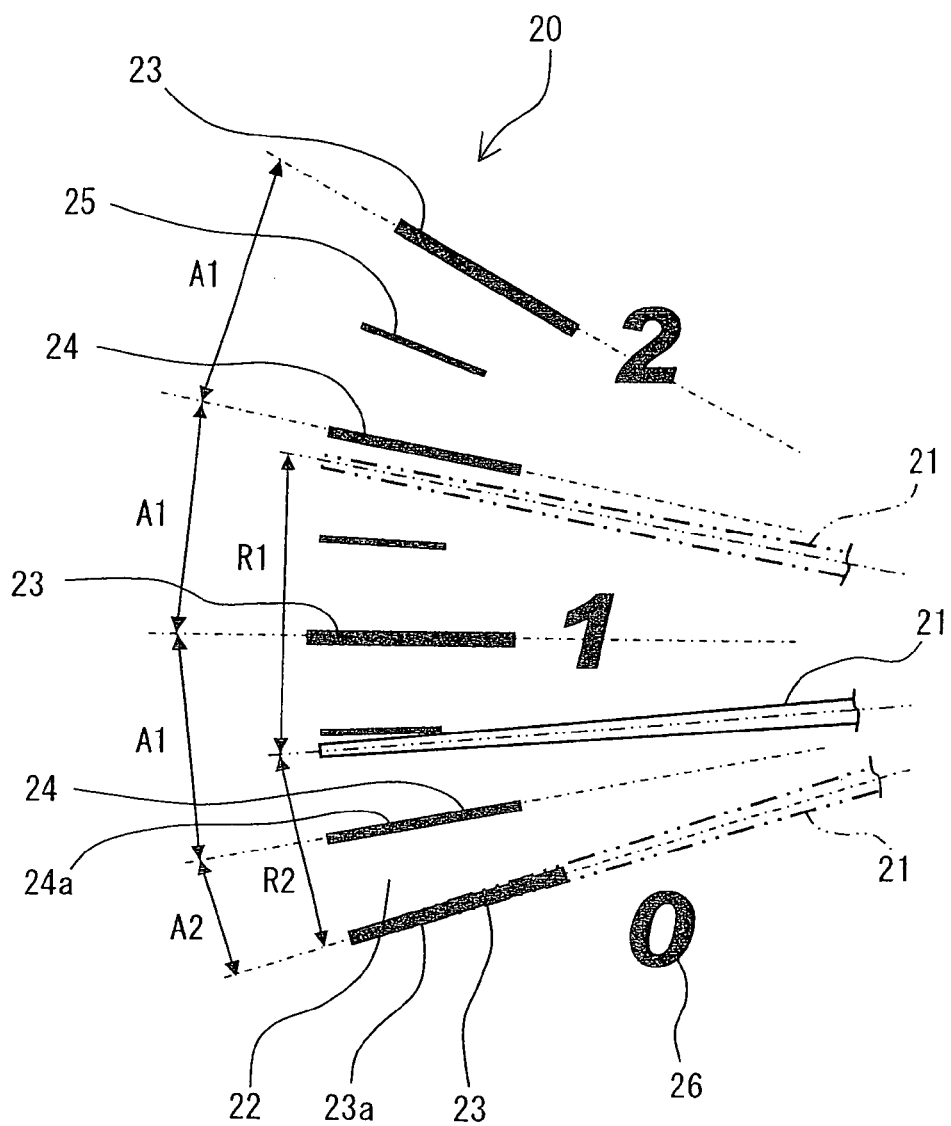
FIG. 3 is a diagram illustrating a partially enlarged view of FIG. 1.

Advantages of the combination meter apparatus 100 according to the first embodiment are described below with further reference to FIG. 3. FIG. 3 is a diagram illustrating a partial enlarged view of FIG. 1.

In the tachometer 20, when the stop idling function is activated, the pointer needle 21 moves from an idling position indicating 700 rpm, which is the idling rotation speed, to a temporary stop position indicating 0 rpm. The amount of movement of the pointer needle 21 with respect to a change in the rotation speed is smaller when the rotation speed is in a low rotation speed range below the idling rotation speed than when the rotation speed is in a high rotation speed range above the idling rotation speed.

Specifically, a second angle R2 by which the pointer needle 21 is displaced when the rotation speed changes by a predetermined value in the low rotation speed range is less than a first angle R1 by which the pointer needle 21 is displaced when the rotation speed changes by the predetermined value in the high rotation speed range.

In an example shown FIG. 3, the pointer needle 21 represented by a solid line points to 700 rpm, which is the idling rotation speed. When the rotation speed changes from 700 rpm to 1400 rpm, i.e., when the rotation speed changes by 700 rpm in the high rotation speed range above the idling rotation speed, the pointer needle 21 is displaced by the first angle R1 and moves from the idling position to a position indicating the rotational speed of 1400 rpm. In contrast, when the rotation speed changes from 700 rpm to 0 rpm upon activation of the stop idling function, i.e., when the rotation speed changes by 700 rpm in the low rotation speed range below the idling rotation speed, the pointer needle 21 is displaced by the second angle R2 less than the first angle R1 and moves from the idling position to the temporary stop position, which is indicated by a first marking 23a.

Further, a distance between the first marking 23 and the second marking 24 located adjacent to the first marking 23 is less in a low region corresponding to the low rotation speed range than in a high region corresponding to the high rotation speed range. Specifically, a first distance A1 between the first marking 23 and the second marking 24 located adjacent to the first marking 23 in the high region is constant. In contrast, a second distance A2 between the first marking 23a indicating 0 rpm and a second marking 24a located adjacent to the first marking 23a in the low region is less than the first distance A1. Further, there is no third marking 25 between the first marking 23a and the second marking 24a in the low region.

The characters 26 are located inside the corresponding first markings 23 in the radial direction of the tachometer 20 and arranged at a regular interval on the path along which the pointer needle 21 moves. Specifically, the characters 26 indicating the numbers "1" to "8" are aligned with the corresponding first markings 23 in the radial direction of the tachometer 20, but the character 26 indicating the number "0" is misaligned with the corresponding first marking 23a in the radial direction of the tachometer 20. A reason for this is that the second distance A2 between the first marking 23a and the second marking 24a in the low region is less than the first distance A1 between the first marking 23 and the second marking 24 in the high region.

As described above, according to the first embodiment, the amount of movement of the pointer needle 21 with respect to the change in the rotation speed is smaller when the rotation speed is in the low rotation speed range below the idling rotation speed than when the rotation speed is in the high rotation speed range above the idling rotation speed. In such an approach, the movement of the pointer needle 21 caused upon activation of the stop idling function can be small enough that the occupants are difficult to recognize whether the pointer needle 21 moves. Therefore, even when the stop idling function is frequently, repeatedly activated, it is less likely that the occupants feel uncomfortable with the frequently repeated movement of the pointer needle 21. Thus, the combination meter apparatus 100 provides a comfortable display of the rotation speed of the output shaft of the engine having the idling stop function.

Further, according to the first embodiment, the distance between the first marking 23 and the second marking 24 in the low region, corresponding to the low rotation speed range, on the dial 22 is less than the distance between the first marking 23 and the second marking 24 in the high region, corresponding to the high rotation speed range, on the dial 22. In such an approach, although the amount of movement of the pointer needle 21 with respect to the change in the rotation speed is smaller when the rotation speed is in the low rotation speed range than when the rotation speed is in the high rotation speed range, the pointer needle 21 can accurately indicate the rotation speed of the output shaft of the engine in conjunction with the first marking 23 and the second marking 24. Thus, the first markings 23 and the second markings 24 are arranged on the dial 22 so that the combination meter apparatus 100 can provide a comfortable display of the rotation speed of the output shaft of the engine having the idling stop function.

Furthermore, according to the first embodiment, the characters 26 indicating the numbers corresponding to the rotation speed are arranged at a regular interval on the dial 22. In such an approach, it is less likely that the occupants feel uncomfortable with the fact that the distance between the first marking 23 and the second marking 24 is different between in the low region and in the high region. Thus, the first markings 23, the second markings 24, and the characters 26 are arranged on the dial 22 so that the combination meter apparatus 100 can provide a comfortable display of the rotation speed of the output shaft of the engine having the idling stop function. The dial 22 serves as an index member in claim 2.

Second Embodiment

A combination meter apparatus 200 according to a second embodiment of the present invention is described below with reference to FIG. 4. A difference between the first embodiment and the second embodiment is that arrangement of first markings 223, second markings 224, and third markings 225 in a region corresponding to the rotation speed range below 1000 rpm.

In the combination meter apparatus 200, first markings 223 are arranged on a dial 222 at a regular interval. Therefore, a distance B21 between adjacent first markings 223 is substantially constant regardless of whether the first markings 223 are located in the high region corresponding to the high rotation speed range above the idling rotation speed or in the low region corresponding to the low rotation speed range below the idling rotation speed.

The first markings 223 and second markings 224 are alternately arranged on the dial 222. A distance A23 between the second marking 224 and the first marking 223 located adjacent to the second marking 224 in the high region is constant. A distance A21 between a second marking 224a and a first marking 223a located adjacent to the second marking 224a in the low region is less than a distance A22 between a first marking 223b and the second marking 224a located adjacent to the second marking 224a in the low region. That is, the second marking 224a is located closer to the first marking 223a in the low region than the first marking 223b in the high region. The first marking 223a indicates the rotation speed of 0 rpm, and the first marking 223b indicates the rotation speed of 1000 rpm.

Specifically, the sum of the distance A22 between the second marking 224a and the first marking 223a and the distance A21 between the second marking 224a and the first marking 223b is equal to the distance B21 between adjacent first markings 223. Further, the sum of the distance A22 and the distance A21 is twice as much as the distance A23 between the first marking 223 and the second marking 224 in the high region.

Each third marking 225 is located in the center between the first marking 223 and the second marking 224 located adjacent to the first marking 223. In the first embodiment, there is no third marking 25 between the first marking 23a and the second marking 24a in the low region. In contrast, in the second embodiment, there is a third marking 255, indicating the rotation speed of 250 rpm, between the first marking 223a and the second marking 224a in the low region.

Like the first embodiment, the amount of movement of the pointer needle 21 with respect to a change in the rotation speed is smaller when the rotation speed is in a low rotation speed range below the idling rotation speed than when the rotation speed is in a high rotation speed range above the idling rotation speed. Specifically, a second angle R22 by which the pointer needle 21 is displaced when the rotation speed changes by a predetermined value in the low rotation speed range is less than a first angle R21 by which the pointer needle 21 is displaced when the rotation speed changes by the predetermined value in the high rotation speed range.

Figure 4:
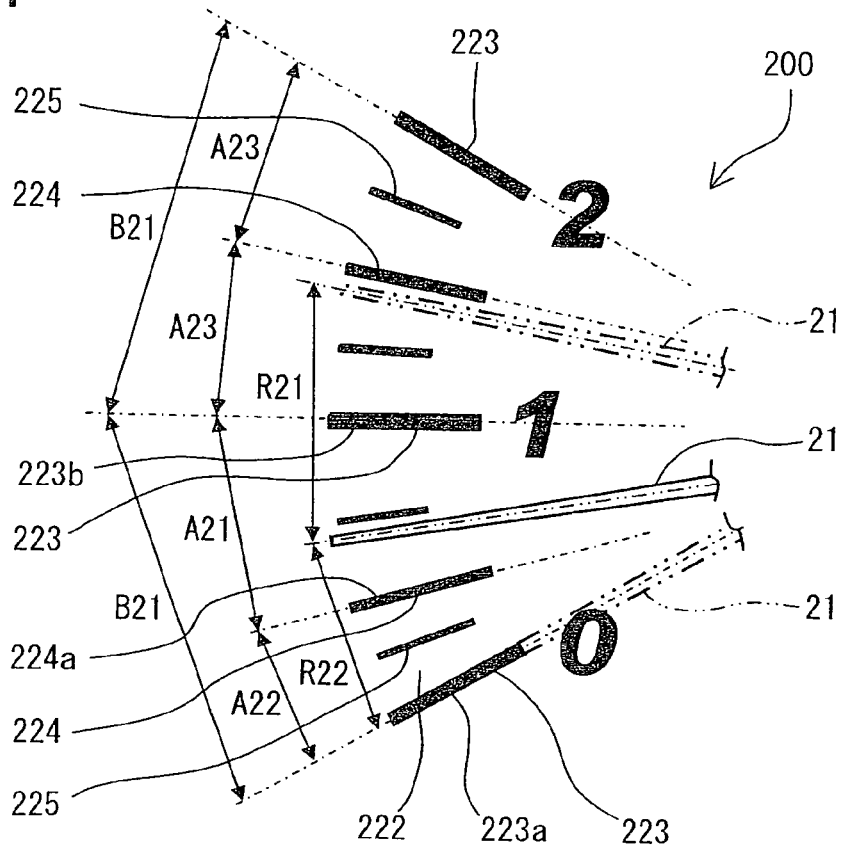
FIG. 4 is a diagram illustrating a partially enlarged front view of a combination meter apparatus according to a second embodiment of the present invention.

In an example shown FIG. 4, the pointer needle 21 represented by a solid line points to 700 rpm, which is the idling rotation speed. When the rotation speed changes from 700 rpm to 1400 rpm, i.e., when the rotation speed changes by 700 rpm in the high rotation speed range above the idling rotation speed, the pointer needle 21 is displaced by the first angel R21 and moves from the idling position to a position indicating the rotational speed of 1400 rpm. In contrast, when the rotation speed changes from 700 rpm to 0 rpm upon activation of the stop idling function, i.e., when the rotation speed changes by 700 rpm in the low rotation speed range below the idling rotation speed, the pointer needle 21 is displaced by the second angle R22 less than the first angle R21 and moves from the idling position to the temporary stop position, which is indicated by the first marking 223a.

As described above, according to the second embodiment, the amount of movement of the pointer needle 21 with respect to the change in the rotation speed is smaller when the rotation speed is in the low rotation speed range below the idling rotation speed than when the rotation speed is in the high rotation speed range above the idling rotation speed. In such an approach, the movement of the pointer needle 21 caused upon activation of the stop idling function can be small enough that the occupants are difficult to recognize whether the pointer needle 21 moves. Therefore, even when the stop idling function is frequently, repeatedly activated, it is less likely that the occupants feel uncomfortable with the frequently repeated movement of the pointer needle 21. Thus, the combination meter apparatus 200 provides a comfortable display of the rotation speed of the output shaft of the engine having the idling stop function.

Further, according to the second embodiment, the first markings 223 are arranged on the dial 222 at a regular interval. Thus, the combination meter apparatus 200 provides a comfortable display of the rotation speed of the output shaft of the engine having the idling stop function.

Furthermore, according to the second embodiment, the distance A22 between the second marking 224a and the first marking 223a in the low region is less than each of the distance A21 and the distance A23. In such an approach, although the amount of movement of the pointer needle 21 with respect to the change in the rotation speed is smaller when the rotation speed is in the low rotation speed range than when the rotation speed is in the high rotation speed range, the pointer needle 21 can accurately indicate the rotation speed of the output shaft of the engine in conjunction with the first marking 223a and the second marking 224a. Thus, the first markings 223 and the second markings 224 are arranged on the dial 222 so that the combination meter apparatus 200 can provide a comfortable display of the rotation speed of the output shaft of the engine having the idling stop function. The dial 222 serves as an index member in claim 3.

Third Embodiment

A combination meter apparatus 300 according to a third embodiment of the present invention is described below with reference to FIG. 5. A difference between the first embodiment and the third embodiment is as follows.

Like the first embodiment, the amount of movement of the pointer needle 21 with respect to a change in the rotation speed is smaller when the rotation speed is in a low rotation speed range below the idling rotation speed than when the rotation speed is in a high rotation speed range above the idling rotation speed. Specifically, the second angle R2 by which the pointer needle 21 is displaced when the rotation speed changes by a predetermined value in the low rotation speed range is less than the first angle R1 by which the pointer needle 21 is displaced when the rotation speed changes by the predetermined value in the high rotation speed range.

Figure 5:
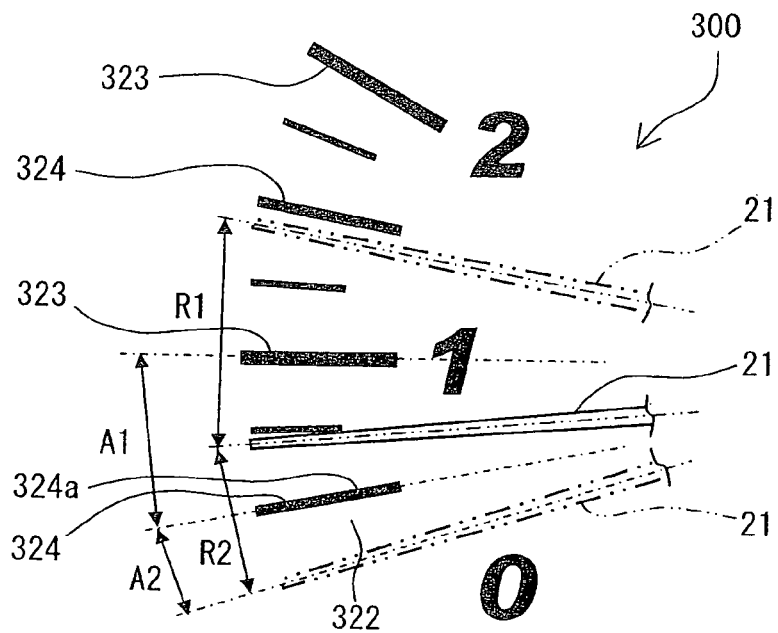
FIG. 5 is a diagram illustrating a partially enlarged front view of a combination meter apparatus according to a third embodiment of the present invention.

In an example shown FIG. 5, the pointer needle 21 represented by a solid line points to 700 rpm, which is the idling rotation speed. When the rotation speed changes from 700 rpm to 1400 rpm, i.e., when the rotation speed changes by 700 rpm in the high rotation speed range above the idling rotation speed, the pointer needle 21 is displaced by the first angel R1 and moves from the idling position to a position indicating the rotational speed of 1400 rpm. In contrast, when the rotation speed changes from 700 rpm to 0 rpm upon activation of the stop idling function, i.e., when the rotation speed changes by 700 rpm in the low rotation speed range below the idling rotation speed, the pointer needle 21 is displaced by the second angle R2 less than the first angle R1 and moves from the idling position to the temporary stop position.

In the combination meter apparatus 300, first markings 323 are arranged at a regular interval on a dial 322 in the high region corresponding to the high rotation speed range above the idling rotation speed. Specifically, the first markings 323 are arranged at a 1000-rpm interval to indicate the rotation speed in a range from 1000 rpm to 8000 rpm. There is no first marking 323 to be located at the distance A2 from a second marking 324a indicating a rotational speed of 500 rpm. That is, there is no first marking 323 indicating a rotation speed of 0 rpm. The distance A1 between the first marking 323 and a second marking 324 located adjacent to the first marking 323 in the high region is constant.

As described above, according to the third embodiment, the amount of movement of the pointer needle 21 with respect to the change in the rotation speed is smaller when the rotation speed is in the low rotation speed range below the idling rotation speed than when the rotation speed is in the high rotation speed range above the idling rotation speed. In such an approach, the movement of the pointer needle 21 caused upon activation of the stop idling function can be small enough that the occupants are difficult to recognize whether the pointer needle 21 moves. Therefore, even when the stop idling function is frequently, repeatedly activated, it is less likely that the occupants feel uncomfortable with the frequently repeated movement of the pointer needle 21. Thus, the combination meter apparatus 200 provides a comfortable display of the rotation speed of the output shaft of the engine having the idling stop function.

Further, according to the third embodiment, the first markings 323 are arranged at a regular interval on the dial 322 only in the high region corresponding to the high rotation speed range above the idling rotation speed. Specifically, the first marking 323 is not located on the dial 322 in the low region corresponding to the low rotation speed range below the idling rotation speed. In such an approach, it is likely that the occupants recognize that the first markings 323 are arranged at a regular interval over the entire region corresponding to the full rotation speed range. Thus, the combination meter apparatus 300 provides a comfortable display of the rotation speed of the output shaft of the engine having the idling stop function. The dial 322 serves as an index member in claim 4.

Fourth Embodiment

Figure 6:
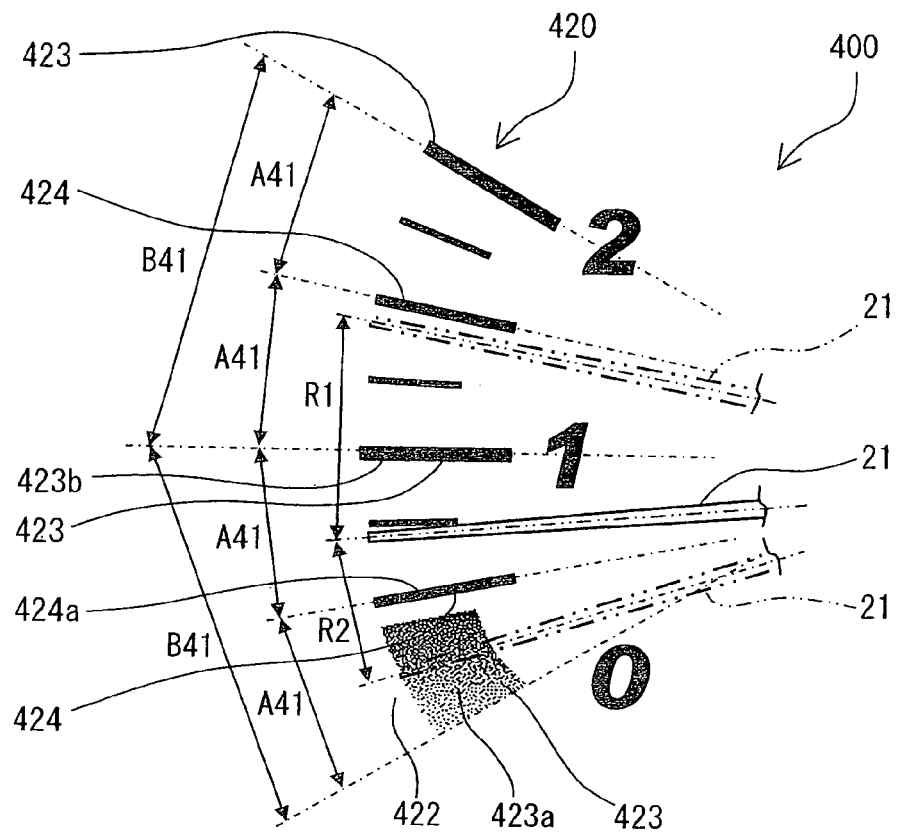
FIG. 6 is a diagram illustrating a partially enlarged front view of a combination meter apparatus according to a fourth embodiment of the present invention.

A combination meter apparatus 400 according to a fourth embodiment of the present invention is described below with reference to FIG. 6. A difference between the first embodiment and the fourth embodiment is as follows.

Like the first embodiment, the amount of movement of the pointer needle 21 with respect to a change in the rotation speed is smaller when the rotation speed is in a low rotation speed range below the idling rotation speed than when the rotation speed is in a high rotation speed range above the idling rotation speed. Specifically, the second angle R2 by which the pointer needle 21 is displaced when the rotation speed changes by a predetermined value in the low rotation speed range is less than the first angle R1 by which the pointer needle 21 is displaced when the rotation speed changes by the predetermined value in the high rotation speed range.

According to the fourth embodiment, a first marking 423a indicating a rotation speed of 0 rpm extends from a position, where the pointer needle 21 is located when the rotation speed is 0 rpm, in a direction away from a second marking 424a located adjacent to the first marking 423a. Specifically, the first marking 423a extends to a position away from the second marking 424a by a distance A11 along the path along which the pointer needle 21 moves. The distance A11 is a distance between a first marking 423 and a second marking 424 located adjacent to the first marking 423. In other words, the first marking 423a extends to a position away from a first marking 423b located adjacent to the first marking 423a by a distance B41 along the path along which the pointer needle 21 moves. The distance B41 is a distance between adjacent first markings 423.

Further, the brightness of the first marking 423a changes along the path along which the pointer needle 21 moves. Specifically, the brightness of the first marking 423a increases with distance from the second marking 424a along the path along which the pointer needle 21 moves. Further, the first marking 423a is shorter in length than any other first marking 423 in a radial direction of a tachometer 420.

As described above, according to the fourth embodiment, the amount of movement of the pointer needle 21 with respect to the change in the rotation speed is smaller when the rotation speed is in the low rotation speed range below the idling rotation speed than when the rotation speed is in the high rotation speed range above the idling rotation speed. In such an approach, the movement of the pointer needle 21 caused upon activation of the stop idling function can be small enough that the occupants are difficult to recognize whether the pointer needle 21 moves. Thus, the combination meter apparatus 400 provides a comfortable display of the rotation speed of the output shaft of the engine having the idling stop function.

Further, according to the fourth embodiment, the first marking 423a extends along the path along which the pointer needle 21 moves so that the size of the first marking 423a can be increased. In such an approach, it is likely that the occupants recognize that the first markings 423 including the first marking 423a are arranged on a dial 422 at a regular interval over the entire region corresponding to the full rotation speed range. Thus, the combination meter apparatus 400 provides a comfortable display of the rotation speed of the output shaft of the engine having the idling stop function.

Since the first marking 423a is different in size and shape form the other first markings 423, the occupants may feel uncomfortable with the differences. According to the fourth embodiment, the first marking 423a is shorter in length than the other first markings 423 in the radial direction of the tachometer 420. In such an approach, the difference in size between the first marking 423a and the other first markings 423 is reduced. Further, according to the fourth embodiment, the brightness of the first marking 423a changes so that the size of the first marking 423a recognized by the occupants can be smaller than the actual size of the first marking 423a. Therefore, it is less likely that the occupants feel uncomfortable with the differences.

The dial 422 serves as an index member in claim 5.

Fifth Embodiment

Figure 7:
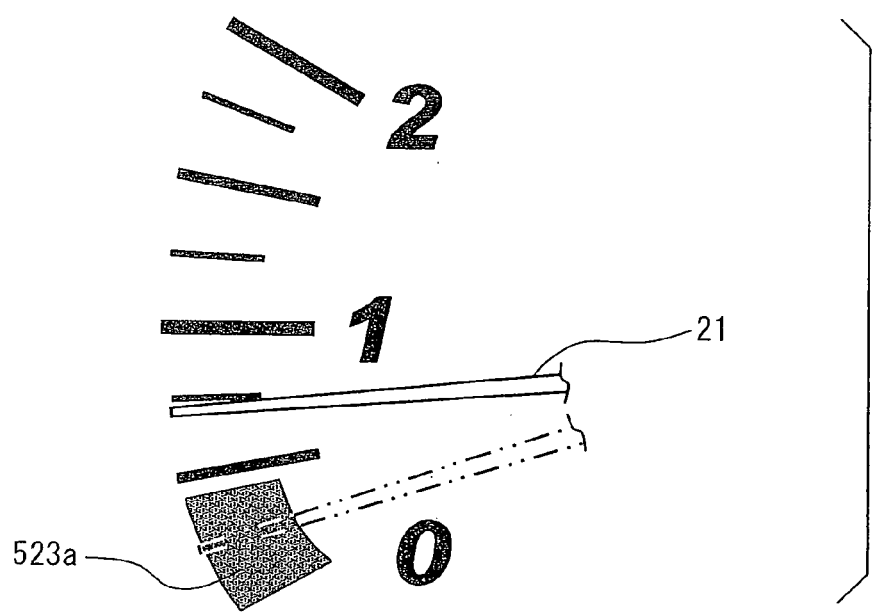
FIG. 7 is a diagram illustrating a partially enlarged front view of a combination meter apparatus according to a fifth embodiment of the present invention.

A combination meter according to a fifth embodiment of the present invention is described below with reference to FIG. 7. A difference between the fourth embodiment and the fifth embodiment is as follows. According to the fourth embodiment, the brightness of the first marking 423a extending along the path along which the pointer needle 21 moves changes. In contrast, according to the fifth embodiment, a first marking 523a, corresponding to the first marking 423a, extending along the path along which the pointer needle 21 moves has a single color and does not change in brightness, chroma, hue, or the like.

Sixth Embodiment

Figure 8:
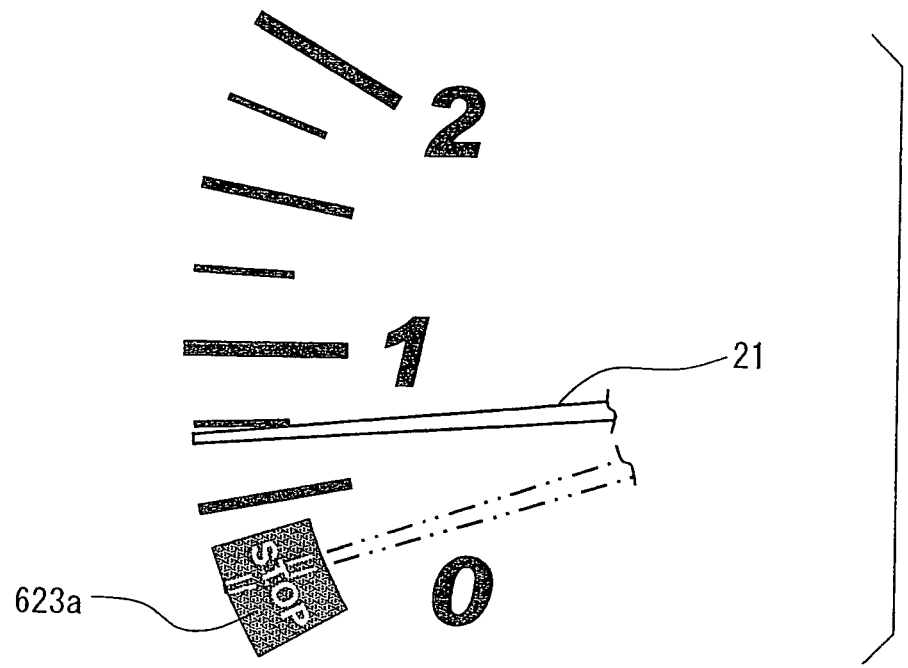
FIG. 8 is a diagram illustrating a partially enlarged front view of a combination meter apparatus according to a sixth embodiment of the present invention.

A combination meter according to a sixth embodiment of the present invention is described below with reference to FIG. 8. A difference between the fourth embodiment and the sixth embodiment is as follows. According to the fifth embodiment, a first marking 623a, corresponding to the first marking 423a, extending along the path along which the pointer needle 21 moves has a word design such as "STOP"

on a solid color background. The word design indicates that the engine is in a stopped condition.

(Modifications)

The embodiment described above can be modified in various ways, for example, as follows.

The above embodiment can be combined together as needed.

In the above embodiments, the rotation speed range indicated by the tachometer is from 0 rpm to 8000 rpm. The rotation speed range indicated by the tachometer can be adjusted according to the internal combustion engine mounted on the vehicle.

In the above embodiments, the first markings are arranged at a 1000-rpm interval, and also the second markings are arranged at a 1000-rpm interval. Alternatively, the first markings and the second markings can be arranged at an interval other than a 1000-rpm interval. For example, the first markings and the second markings can be arranged at a 500-rpm interval or a 2000-rpm interval.

In the above embodiments, the idling rotation speed of the engine is set to 700 rpm. The idling rotation speed of the engine is not limited to 700 rpm. For example, when the engine is a diesel engine, the idling rotation speed can range from 300 rpm to 700 rpm. The region, where the amount of movement of the pointer needle 21 with respect to the change in the rotation speed is reduced, and the region, where the distance between the markings is reduced, can be adjusted according to the idling rotation speed.

In the above embodiments, the characters 26 indicating the numbers corresponding to the rotation speed are arranged at a regular interval on the dial over the entire region corresponding to the full rotation speed range. Alternatively, the distance between adjacent characters 26 in the low region corresponding to the rotation speed range below the idling rotation speed can be less than the distance between adjacent characters 26 in the high region corresponding to the rotation speed range above the idling rotation speed. Specifically, the character 26 indicating the number "0" can be located close to the character 26 indicating the number "1". Alternatively, the character 26 indicating the number "0" can be removed from the dial.

In the above embodiments, the first marking, the second marking, and the third marking have different sizes. Alternatively, al least two of the first marking, the second marking, and the third marking can have the same size. Alternatively, the first marking, the second marking, and the third marking can be different from each other in hue, brightness, or the like. Alternatively, the second marking and the third marking can be removed from the dial.

In the above embodiments, the pointer needle 21 is fixed to and moved by the step motor 60. Alternatively, the pointer needle 21 can be moved by a mechanism other than the step motor 60. For example, the pointer needle 21 can be moved by various types of actuator.

In the above embodiments, the pointer needle 21 performs a rotary movement according to the rotation speed of the engine. Alternatively, the pointer needle 21 can perform a movement other than the rotary movement according to the rotation speed of the engine. For example, the pointer needle 21 can perform a linear movement according to the rotation speed of the engine.

Such changes and modifications are to be understood as being within the scope of the present invention as defined by the appended claims.

What is claimed is:

1. A meter apparatus mountable on a vehicle equipped with an internal combustion engine having an output shaft configured to rotate at a predetermined idling speed during idling of the engine, the output shaft rotating at the idling speed being stopped temporarily when the vehicle satisfies a predetermined stop condition, the meter apparatus comprising:
a pointer needle configured to move according to a rotation speed of the output shaft to indicate the rotation speed, wherein
the amount of movement of the pointer needle with respect to a change in the rotation speed is less when the rotation speed is in a low speed range below the idling speed than when the rotation speed is in a high speed range above the idling speed.

2. The meter apparatus according to claim 1, further comprising:
an index member having a plurality of markings arranged along a path along which the pointer needle moves to indicate the rotation speed in conjunction with the pointer needle, wherein
a distance between adjacent markings is less in a low region corresponding to the low speed range than in a high region corresponding to the high speed range.

3. The meter apparatus according to claim 1, further comprising:
an index member having a plurality of primary markings and a plurality of secondary markings, the plurality of primary markings and the plurality of secondary markings being alternately arranged along a path along which the pointer needle moves to indicate the rotation speed in conjunction with the pointer needle, wherein
the plurality of primary markings is arranged at a regular interval,
one of the plurality of secondary markings is located in a low region corresponding to the low speed range,
a first one of the plurality of primary markings is located in a high region corresponding to the high speed range and located adjacent to the one of the plurality of secondary markings,
a second one of the plurality of primary markings is located in the low region and located adjacent to the one of the plurality of secondary markings,
the second one of the plurality of primary markings indicates the rotation speed of zero, and
the one of the plurality of secondary markings is located closer to the second one of the plurality of primary markings than the first one of the plurality of primary markings.

4. The meter apparatus according to claim 1, further comprising:
an index member having a plurality of markings arranged along a path along which the pointer needle moves to indicate the rotation speed in conjunction with the pointer needle, wherein
the plurality of markings is arranged at a regular interval in a high region corresponding to the high speed range.

5. The meter apparatus according to claim 1, further comprising:
an index member having a plurality of markings arranged along a path along which the pointer needle moves to indicate the rotation speed in conjunction with the pointer needle, wherein
a first one of the plurality of markings indicates the rotation speed of zero,
a second one of the plurality of markings is located adjacent to the first one of the plurality of markings,
a third one of the plurality of markings is located adjacent to the second one of the plurality of markings and separated from the second one of the plurality of markings by a predetermined distance, and the first one of the plurality of markings extends along the path from the second one of the plurality of markings by the predetermined distance.

6. The meter apparatus according to claim 5, wherein at least one of brightness and chroma of the first one of the plurality of markings changes along the path.

* * * * *